(12) United States Patent
Sakatani et al.

(10) Patent No.: US 7,011,808 B2
(45) Date of Patent: Mar. 14, 2006

(54) TITANIUM OXIDE AND PHOTOCATALYST

(75) Inventors: Yoshiaki Sakatani, Niihama (JP);
Hiroyuki Ando, Niihama (JP);
Hironobu Koike, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 638 days.

(21) Appl. No.: 09/901,609

(22) Filed: Jul. 11, 2001

(65) Prior Publication Data

US 2002/0021999 A1 Feb. 21, 2002

(30) Foreign Application Priority Data

Jul. 17, 2000 (JP) .................................... 2000-215483
Dec. 15, 2000 (JP) .................................... 2000-381723

(51) Int. Cl.
*C01G 23/047* (2006.01)

(52) U.S. Cl. ...................................... 423/610; 502/350
(58) Field of Classification Search ................ 423/610; 502/350; 106/436
See application file for complete search history.

(56) References Cited

U.S. PATENT DOCUMENTS

| | | | |
|---|---|---|---|
| 5,011,674 | A | 4/1991 | Yoshimoto et al. |
| 5,840,111 | A | 11/1998 | Wiederhoeft et al. |
| 6,107,241 | A | 8/2000 | Ogata et al. |
| 6,429,169 | B1 | 8/2002 | Ichinose |
| 2001/0056037 | A1 | 12/2001 | Sakatani et al. |
| 2002/0012628 | A1 | 1/2002 | Sawabe et al. |
| 2003/0068268 | A1 | 4/2003 | Sakatani et al. |

FOREIGN PATENT DOCUMENTS

| | | |
|---|---|---|
| EP | 1 065 169 A1 | 1/2001 |
| EP | 1 065 169 A | 1/2001 |
| EP | 1 095 908 A1 | 5/2001 |
| EP | 1 125 636 A1 | 8/2001 |
| EP | 1 138 634 A | 10/2001 |
| EP | 1 205 244 A1 | 5/2002 |
| EP | 1 254 863 A1 | 11/2002 |
| GB | 1 189 746 A | 4/1970 |
| JP | 09-71418 A | 3/1997 |
| JP | 2000-140636 | 5/2000 |
| JP | 2001-246247 A | 9/2001 |
| JP | 2001-294425 A | 10/2001 |

OTHER PUBLICATIONS

S. Sato, "Photocatalytic Activity of $NO_x$–Doped $TiO_2$ In The Visible Light Region", Chemical Physics Letters, vol. 123, No. 1,2 (pp. 126–128) no date.

M. Che et al., "Nature of Paramagnetic Species Produced by Oxygen Treatment of Titanium Dioxide", *Chemical Physics Letters*, vol. 8, No. 1, Jan. 1, 1971, pp. 45–48.

H. Noda et al., "Preparation of Titanium (IV) Oxides and Its Characterization", *The Chemical Society of Japan*, No. 8, Mar. 8, 1986, pp. 1084–1090 with complete English translation.

*Primary Examiner*—Stanley S. Silverman
*Assistant Examiner*—Edward M. Johnson
(74) *Attorney, Agent, or Firm*—Sughrue Mion, PLLC

(57) ABSTRACT

A titanium oxide showing sufficiently high photocatalytic activities by irradiation of visible light is provided. Using the titanium oxide, an excellent photocatalyst and photocatalyst coating composition are also provided. The titanium oxide has a selected ion chromatogram in which an evolution gas having 28 of a ratio of mass number to electric charge quantity exhibits at least one peak at about 600° C. or higher, the selected ion chromatogram being measured in a thermogravimetry-mass-spectroscopy.

13 Claims, 4 Drawing Sheets

__US 7,011,808 B2__

TITANIUM OXIDE AND PHOTOCATALYST

FIELD OF THE INVENTION

The present invention relates to a titanium oxide, a photocatalyst using the titanium oxide and a photocatalyst coating composition using the titanium oxide.

BACKGROUND OF THE INVENTION

Ultraviolet irradiation to a semiconductor generates electrons having a strong reduction activity and positive holes having a strong oxidation activity, to decompose a molecular species that comes in contact with the semiconductor by an oxidation-reduction activity. Such an activity is called a photocatalytic activity. By the photocatalytic activity, bad-smelling substances in a living or working space are decomposed and removed, and substances such as organic solvents, agrochemicals and surfactants in water are decomposed and removed. As a substance showing the photocatalytic activity, titanium oxide is attracting much attention and photocatalysts made of titanium oxide are in the market.

However, the photocatalytic activity shown by the photocatalysts made of titanium oxide available in the present market is not sufficient when the photocatalysts are irradiated with visible light.

SUMMARY OF THE INVENTION

The objects of the present invention is to provide a titanium oxide that shows sufficiently high photocatalytic activities by irradiation of visible light, to provide a photocatalyst using the titanium oxide as a catalyst component and to provide a photocatalyst coating composition using the titanium oxide.

The present inventors have studied on titanium oxide in order to achieve such objects. As a result, the present inventors have got a titanium oxide which shows sufficiently high photocatalytic activities by irradiation of visible light, and have completed the present invention.

Thus, the present invention provides a titanium oxide having a selected ion chromatogram in which an evolution gas having 28 of a ratio of mass number to electric charge quantity exhibits a peak at about 600° C. or higher, the selected ion chromatogram being measured in a thermogravimetry-mass-spectroscopy.

The present invention also provides a photocatalyst containing the above-described titanium oxide as a catalyst component.

The invention further provides a photocatalyst coating composition comprising the above-described titanium oxide and a solvent.

DETAILED DESCRIPTION OF THE INVENTION

Figure 1:
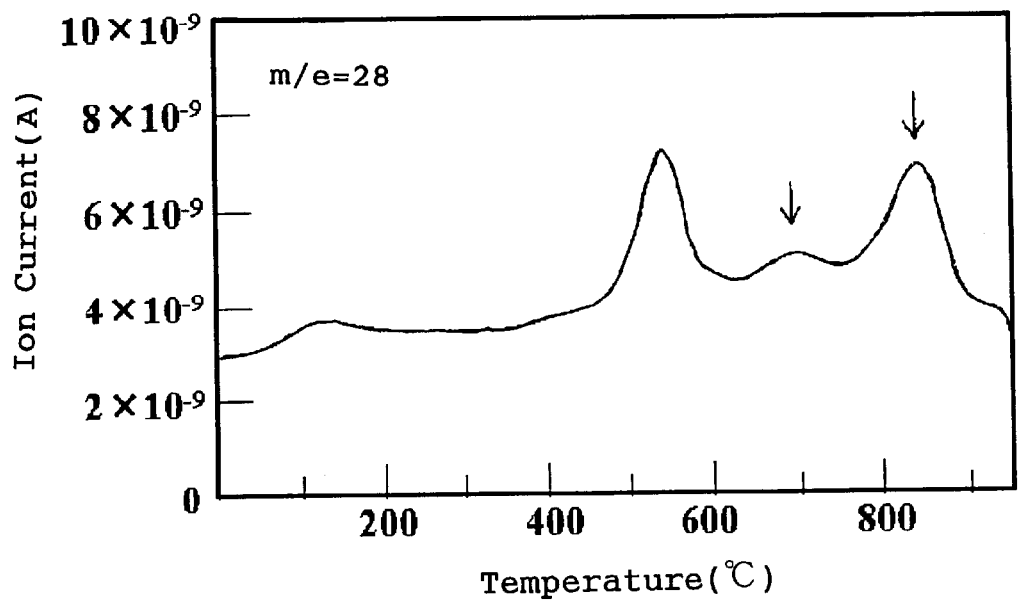
FIG. 1 is a selected ion chromatogram of the titanium oxide (which was obtained in Example 1) of the present invention, as to an evolution gas having 28 of a ratio "m/e" of mass number "m" to electric charge quantity "e", the selected ion chromatogram being measured in a thermogravimetry-mass-spectroscopy under a condition of applying a CEM voltage of 1500V.

A titanium oxide of the present invention usually has a chemical formula of $TiO_2$ and contains a component which leaves away from the titanium oxide at a high temperature. Namely, the titanium oxide of the present invention has a selected ion chromatogram in which an evolution gas having 28 of a ratio "m/e" of mass number "m" to electric charge quantity "e" exhibits a peak at about 600° C. or higher, the selected ion chromatogram being measured in a thermogravimetry-mass-spectroscopy (hereinafter, referred to as "TG-MS"). Such a selected ion chromatogram shows that once the titanium oxide is heated at a constant rate of temperature rise, a certain component (namely, evolution gas) is released at 600° C. or higher. Also, such a selected ion chromatogram shows that the titanium oxide contains the component having such a physical property and/or the precursor of the component. The selected ion chromatogram is preferably measured under a condition of applying a Channeltron Electron Multiplier (hereinafter, referred to as "CEM") voltage of 1000V or 1500V.

The titanium oxide of the present invention shows a peak of the evolution gas having 28 of the m/e ratio at a high temperature in its selected ion chromatogram measured in TG-MS. The higher temperature at which the peak appears, the better the titanium oxide becomes. When the selected ion chromatogram of the titanium oxide is measured, the peak of the evolution gas having 28 of the m/e ratio may appear at about 600° C. or higher, and preferably appears at about 670° C. or higher. Also, the peak of the evolution gas having 28 of the m/e ratio preferably appears at about 950° C. or lower, and more preferably appears at about 900° C. or lower.

According to "The Wiley/NBS Registry of Mass Spectral Data Volume 1" etc., the evolution gas having 28 of the m/e ratio may be nitrogen molecule ($N_2$).

The titanium oxide of the present invention may further have a selected ion chromatogram in which an evolution gas having 14 of the m/e ratio exhibits a peak at about 600° C. or higher, the selected ion chromatogram being measured in a TG-MS.

The titanium oxide of the present invention may show a peak of the evolution gas having 14 of the m/e ratio at a high temperature in its selected ion chromatogram measured in TG-MS. The higher temperature at which the peak appears, the better the titanium oxide becomes. When the selected ion chromatogram of the titanium oxide is measured, the peak of the evolution gas having 14 of the m/e ratio preferably appears at about 600° C. or higher, and more preferably appears at about 670° C. or higher. Also, the peak of the evolution gas having 14 of the m/e ratio preferably appears at about 950° C. or lower, and more preferably appears at about 900° C. or lower.

The evolution gas having 14 of the m/e ratio may be nitrogen atom (N).

Alternatively, the titanium oxide of the present invention may further have a selected ion chromatogram in which an evolution gas having 64 of the m/e ratio exhibits a peak at about 400° C. or higher, the selected ion chromatogram being measured in a TG-MS.

The titanium oxide of the present invention may show a peak of the evolution gas having 64 of the m/e ratio at a high temperature in its selected ion chromatogram measured in TG-MS. The higher temperature at which the peak appears, the better the titanium oxide becomes. When the selected ion chromatogram of the titanium oxide is measured, the peak of the evolution gas having 64 of the m/e ratio preferably appears at about 650° C. or higher, and more preferably appears at about 800° C. or higher. Also, the peak of the evolution gas having 64 of the m/e ratio preferably appears at about 950° C. or lower.

The evolution gas having 64 of the m/e ratio may be sulfur dioxide ($SO_2$).

In terms of L*a*b* color space which is defined by Commission International de l'Eclairage, the titanium oxide of the present invention may have an a* value of −1 or less and a b* value of 4 or more. In order to adjust the color tone and coloring hue of the titanium oxide depending on an aimed product photocatalyst containing the titanium oxide achieving its photocatalytic activity, the a* value is preferably −1.2 or less, and more preferably −2 or less, and preferably −6 or more. The b* value is preferably 8 or more, and more preferably 15 or more. It is noted that the a* value and b* value are the hue and the saturation, respectively, and are defined with JIS Z-8729 in Japan.

The shape of the titanium oxide in the present invention may vary depending on how to use it and it is not limited. Examples of the shape may include particulate shape and fibrous shape. Inorganic compound(s) other than titanium oxide may be mixed with the titanium oxide of the preset invention as long as the compound(s) does/do not give adverse effects to the photocatalytic activity of the titanium oxide. After the mixing, the resulting titanium oxide may be subjected to a heating treatment or the like so as to produce a composite product thereof. Examples of such inorganic compound(s) may include silica ($SiO_2$), alumina ($Al_2O_3$), zirconia ($ZrO_2$), magnesia (MgO), zinc oxide (ZnO), iron oxide ($Fe_2O_3$, $Fe_3O_4$), zeolite and molecursieve. By such a mixing with inorganic compound(s), a photocatalyst having an improved activity and/or having a variety of colors may be obtained, which provides a wide range of usage thereof.

The titanium oxide in the present invention can be produced, for example, as follows:

A titanium oxysulfate solution is condensed using an evaporator at a temperature of 95° C. or lower, to obtain a solid titanium oxysulfate having a content of 50% by weight or more in terms of $TiOSO_4$. While stirring, the obtained solid titanium oxysulfate is added to (and reacted with) a cooled base such as ammonia. The resulting mixture is subjected to a solid-liquid separation to obtain a solid therein. The solid is then calcined at about 300° C. to about 500° C., to obtain a titanium oxide of the present invention. In this process for preparing the titanium oxide, the temperature of reaction between the solid titanium oxysulfate and the base may be about 40° C. or lower, and preferably about −5° C. or lower. The lower the temperature is, the more preferable the obtained titanium oxide becomes.

A photocatalyst in the present invention contains the above-described titanium oxide as a catalyst component.

Examples of the photocatalyst include a sheet-shaped photocatalyst obtained by adding a bonding agent, an inorganic compound (such as silica, alumina, zirconia, magnesia, zinc oxide, iron oxide, zeolite and molecursieve) and/or a commercially available titanium oxide, into a particulate titanium oxide and then conducting an extrusion molding of the resulting mixture; a sheet-shaped photocatalyst obtained by entangling a fibrous titanium oxide and organic fibers; and a photocatalyst obtained by applying a titanium oxide onto a metallic or resinous substrate or coating such a substrate with the titanium oxide. Examples of the bonding agent include an organic bonding agent such as a cellulose derivative and a polyvinyl alcohol and an inorganic bonding agent such as a silica sol, an alumina sol, a titania sol, a silica-alumina sol and a zirconia sol. Each amount of the bonding agent and the inorganic compound to be added to the titanium oxide may be determined depending on the method of using the photocatalyst. The photocatalyst may contain a molding assistant, a polymer resin, an antistatic agent, an adsorbent and the like.

In using the photocatalyst, the photocatalyst may be put in a visible-light-transmitting glass tube or container together with a liquid or gas to be treated, and then be irradiated with visible light using a light source. In the irradiation of visible light to the photocatalyst, the liquid or gas in the tube or container may be oxidized, reduced or decomposed. The light source is not particularly limited as long as it can emit visible light having a wavelength of 430 nm or more. Example of the light source include solar rays, a fluorescent lamp, a halogen lamp, a black light, a xenon lamp, a mercury arc lamp and a sodium lamp. The light source may be equipped with an ultraviolet-cutting filter and/or an infrared-cutting filter, if necessary. Irradiation time of light may be determined depending on light intensity of the light source, and the kind and amount of the liquid or gas to be treated. When the irradiation is conducted in a batch process, the irradiation time may be a period of time for irradiating light onto the photocatalyst to conduct the photocatalytic reaction. When the irradiation is conducted in a continuous process, the irradiation time may be an average residence time of the liquid or gas to be treated in the tube or container.

A photocatalyst coating composition in the present invention comprises the above-described titanium oxide and a solvent. The photocatalyst coating composition makes it possible to easily apply the titanium oxide onto various materials such as a construction material and an automobile material, to coat such various materials with the titanium oxide and to impart a high photocatalytic activity into such various materials. A preferable solvent to be contained in the photocatalyst coating composition is a solvent which evaporates and does not remain with titanium oxide after the applying or coating of the composition. Examples of the solvent include water, hydrochloric acid, alcohols and ketones.

The photocatalyst coating composition can be produced, for example, by a method in which a titanium oxide is dispersed in water to obtain a slurry thereof or a method in which a titanium oxide is peptized with an acid. Upon dispersion, a dispersing agent may be added thereto, if necessary.

As described above, the titanium oxide in the present invention exhibits a high photocatalytic activity by irradiation of visible light having a wavelength of 430 nm or more. Due to such photocatalytic activity of the titanium oxide, the photocatalyst in the present invention can effectively decompose various organic compounds such as ketones (for example, acetone or the like), while the photocatalyst may be the titanium oxide itself of the present invention. The photocatalyst coating composition in the present invention makes it possible to easily apply the titanium oxide onto various materials such as a construction material and an automobile material, to coat such various materials with the titanium oxide and to impart a high photocatalytic activity into such various materials.

The titanium oxide, and the photocatalyst and the photocatalyst coating composition using the titanium oxide in the present invention are described in Japanese application nos. 2000-215483, filed Jul. 17, 2000 and/or 2000-381723, filed Dec. 15, 2000, the complete disclosures of which are incorporated herein by reference.

The invention being thus described, it will be apparent that the same may be varied in many ways. Such variations are to be regarded as within the spirit and scope of the invention, and all such modifications as would be apparent to one skilled in the art are intended to be within the scope of the following claims.

EXAMPLES

The present invention is described in more detail by following Examples, which should not be construed as a limitation upon the scope of the present invention.

A selected ion chromatogram of the sample titanium oxide was measured with a thermogravimetry-mass-spectroscopy as follows:

The sample titanium oxide was analyzed using a thermogravimetry-mass-spectroscopy (trade name: "Thermo Mass", manufactured by Rigaku Corporation) under the conditions described below.

The rate of heating 40° C./min

The He gas flowing rate into the measurement atmosphere: 300 ml/min.

The measurement pan: platinum

Emission: 1.0 mA

The analysis results were dealt with an analysis software (trade mane: "QUADVISION", manufactured by ANELVA Corporation) to obtain a selected ion chromatogram of the titanium oxide, plotting the ion current in ordinate and the temperature in abscissa.

The selected ion chromatograms as to the evolution gases, each having 14 or 28 of the m/e ratio, were measured at a temperature of form room temperature to 950° C. in applying a CEM voltage of 1500V, and at a temperature of form room temperature to 900° C. in applying a CEM voltage of 1000V. The selected ion chromatogram as to the evolution gas having 64 of the m/e ratio was measured at a temperature of form room temperature to 950° C. in applying a CEM voltage of 1500V.

The hue value a* and the saturation value b* of the sample titanium oxide are obtained using a color-difference meter (trade name: "Z-300A", manufactured by Nippon Denshoku Industries Co., Ltd.) in accordance with JIS Z-8729 (1994).

Example 1

Into a flask charged with water (133 g), a titanium oxysulfate (200 g) (manufactured by Soekawa Chemical Co., Ltd.) was added and dissolved therein, while stirring. The resulting solution was condensed using a evaporator at 80° C. to remove water and obtain a concentrate. The content of $TiOSO_4$ in the concentrate was 65% by weight. Separately, a 25% ammonia water (900 g) (Special grade, manufactured by Wako Pure Chemical Industries, Ltd.) was cooled with a refrigerant having a temperature of −30° C., while stirring at 400 rpm. Into the cooled ammonia water with stirring, the above-obtained concentrate was added, to obtain a solid in the resulting mixture. After stopping the stirring to precipitate the solid, the mixture was filtered to obtain the solid therein. The solid was washed, dried and then calcined at 400° C. in air for one hour to obtain a particulate titanium oxide.

Figure 3:
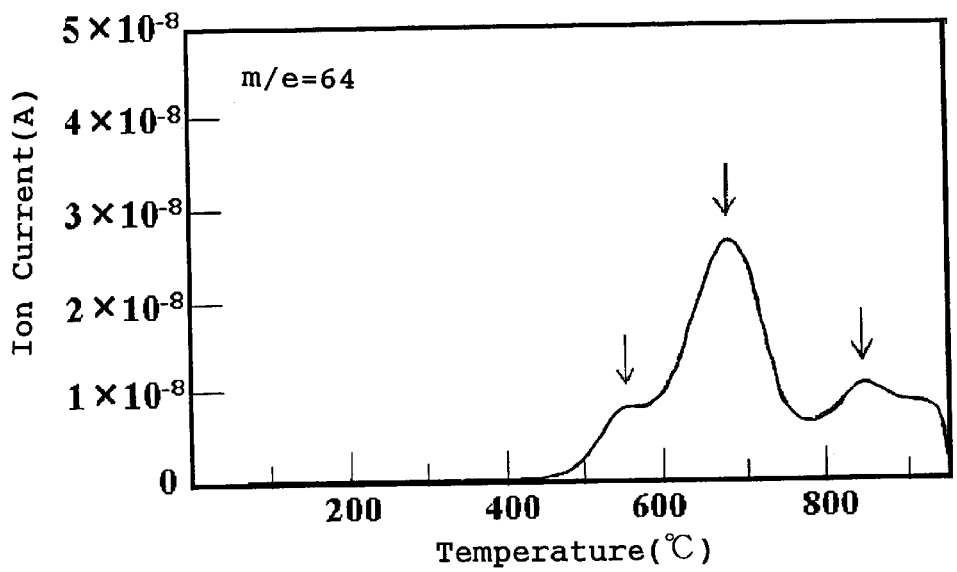
FIG. 3 is a selected ion chromatogram of the titanium oxide (which was obtained in Example 1) of the present invention, as to an evolution gas having 64 of the m/e ratio, the selected ion chromatogram being measured in a thermogravimetry-mass-spectroscopy under a condition of applying a CEM voltage of 1500V.
Figure 4:
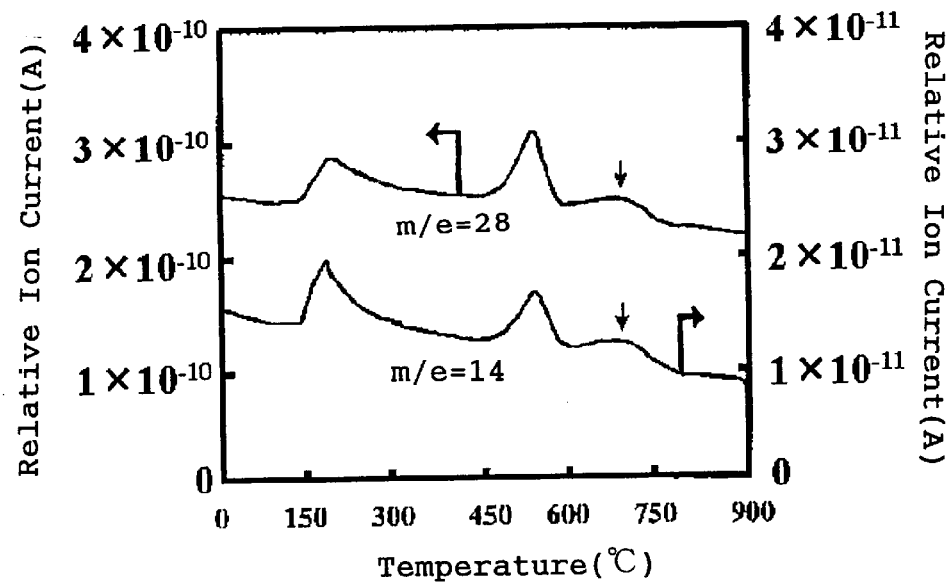
FIG. 4 is selected ion chromatograms of the titanium oxide (which was obtained in Example 1) of the present invention, as to evolution gases each having 28 or 14 of the m/e ratio, the selected ion chromatograms being measured in a thermogravimetry-mass-spectroscopy under a condition of applying a CEM voltage of 1000V.

The selected ion chromatograms of the obtained titanium oxide were measured in applying a CEM voltage of 1500V (shown in FIGS. 1 to 3) and in applying a CEM voltage of 1000V (shown in FIG. 4).

Figure 2:
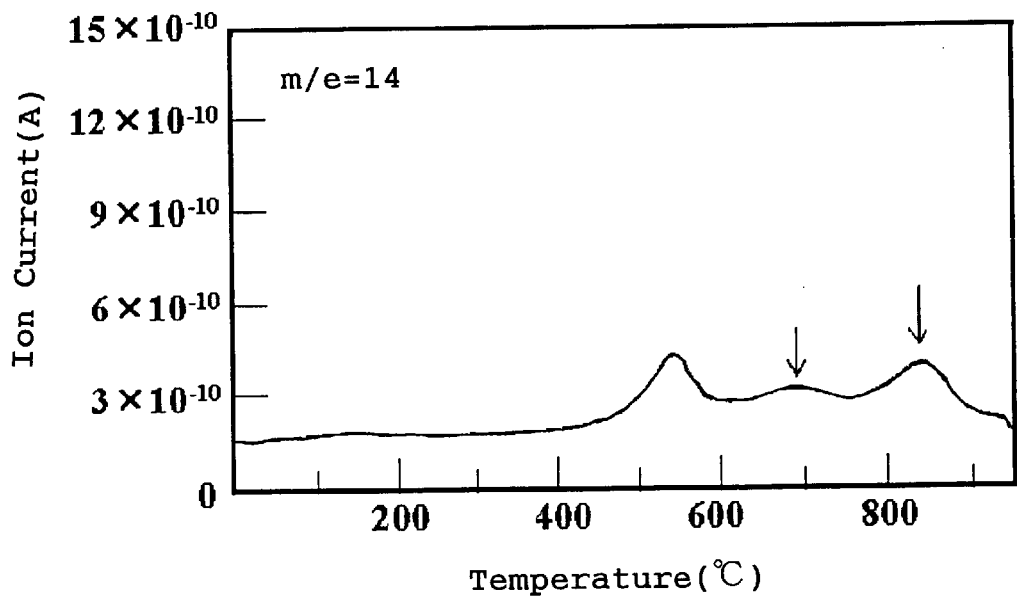
FIG. 2 is a selected ion chromatogram of the titanium oxide (which was obtained in Example 1) of the present invention, as to an evolution gas having 14 of the m/e ratio, the selected ion chromatogram being measured in a thermogravimetry-mass-spectroscopy under a condition of applying a CEM voltage of 1500V.

FIG. 1 shows that the selected ion chromatogram of the evolution gas having 28 of the m/e ratio exhibits peaks at 697° C. and at 837° C. in applying a CEM voltage of 1500V. FIG. 2 shows that the selected ion chromatogram of the evolution gas having 14 of the m/e ratio exhibits peaks at 697° C. and at 837° C. in applying a CEM voltage of 1500V. FIG. 3 shows that the selected ion chromatogram of the evolution gas having 64 of the m/e ratio exhibits peaks at 56° C., at 680° C. and at 846° C. in applying a CEM voltage of 1500V. FIG. 4 shows that the selected ion chromatogram of the evolution gas having 28 of the m/e ratio exhibits peaks at 688° C. in applying a CEM voltage of 1000V. FIG. 4 also shows that the selected ion chromatogram of the evolution gas having 14 of the m/e ratio exhibits peaks at 688° C. in applying a CEM voltage of 1000V.

The obtained titanium oxide had an a* value of −2.58 and a b* value of 41.00.

In a sealed-type glass reaction vessel (diameter: 8 cm, height: 10 cm, volume: about 0.5 L), was placed a 5-cm diameter glass Petri dish on which 0.3 g of photocatalyst made only of the particulate titanium oxide obtained above. The reaction vessel was filled with a mixed gas having an oxygen content of 20% by volume and a nitrogen content of 80% by volume, was sealed with 13.4 μmol of acetone and was then irradiated with visible light from outside of the vessel. The visible light irradiation was carried out using a light source device (manufactured by USHIO INC., trade name: Optical Modulex SX-UI500XQ) which is equipped with a 500 W xenon lamp (manufactured by USHIO INC., trade name: Lamp UXL-500SX), an ultraviolet cutting filter (manufactured by Asahi Techno Glass Co., Ltd., trade name:

Y-45) cutting off ultraviolet light having a wavelength of about 430 nm or shorter and an infrared light cutting filter (manufactured by USHIO INC., trade name: Supercold Filter) cutting off infrared light having a wavelength of about 830 nm or longer. The photocatalytic activity of the photocatalyst was evaluated by measurement of a concentration of carbon dioxide, that is the decomposition product of acetone and is generated by the irradiation of visible light. The carbon dioxide concentration was measured using a photoacoustic multigas monitor (Model: 1312, manufactured by INNOVA) with the passage of time. The producing rate of carbon dioxide was 14.63 μmol/h per one gram of the photocatalyst.

Comparative Example 1

The same processes as in Example 1 were carried out except that, instead of the photocatalyst made only of the particulate titanium oxide obtained in Example 1, a photocatalyst made only of a commercially available titanium oxide (manufactured by Ishihara Sangyo Kaisha, Ltd., trade name: ST-01) was used. As a result, the producing rate of carbon dioxide was 0.66 μmol/h per one gram of the photocatalyst.

Figure 7:
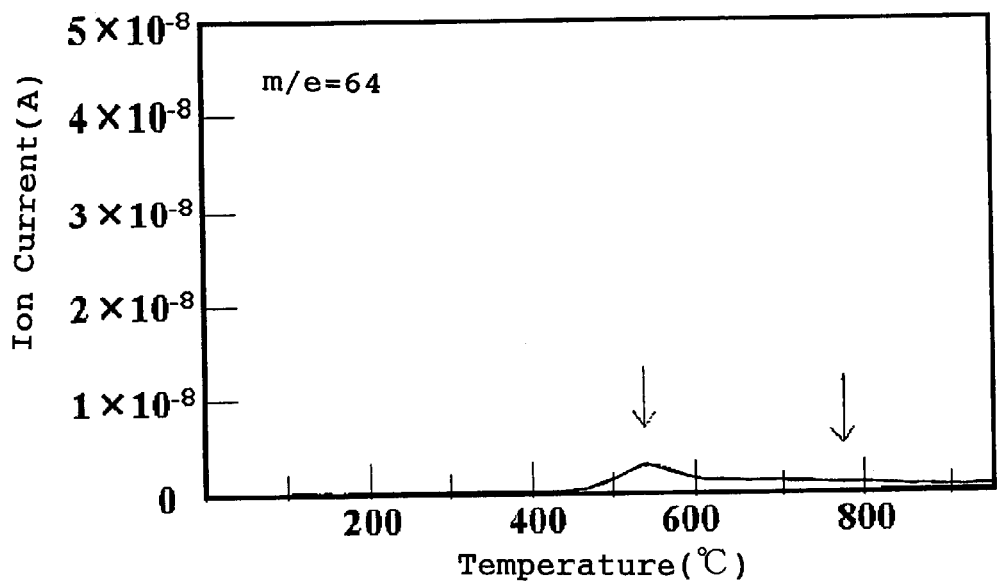
FIG. 7 is a selected ion chromatogram of the commercially available titanium oxide (which was utilized in Comparative Example 1), as to an evolution gas having 64 of the m/e ratio, the selected ion chromatogram being measured in a thermogravimetry-mass-spectroscopy under a condition of applying a CEM voltage of 1500V.
Figure 8:
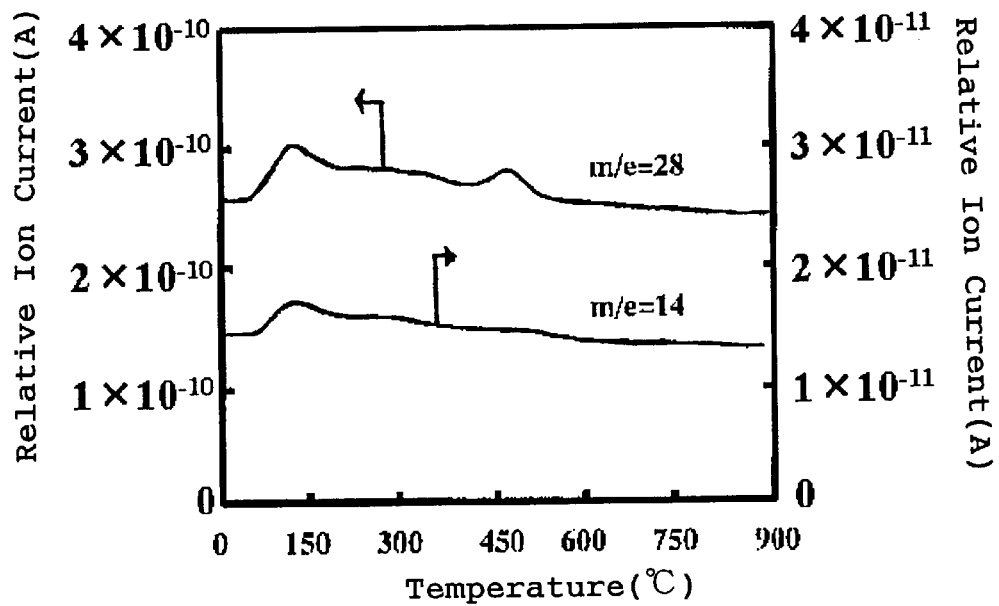
FIG. 8 is selected ion chromatograms of the commercially available titanium oxide (which was utilized in Comparative Example 1), as to evolution gases each having 28 or 14 of the m/e ratio, the selected ion chromatograms being measured in a thermogravimetry-mass-spectroscopy under a condition of applying a CEM voltage of 1000V.

The selected ion chromatograms of the commercially available titanium oxide were measured in applying a CEM voltage of 1500V (shown in FIGS. 5 to 7) and in applying a CEM voltage of 1000V (shown in FIG. 8).

Figure 5:
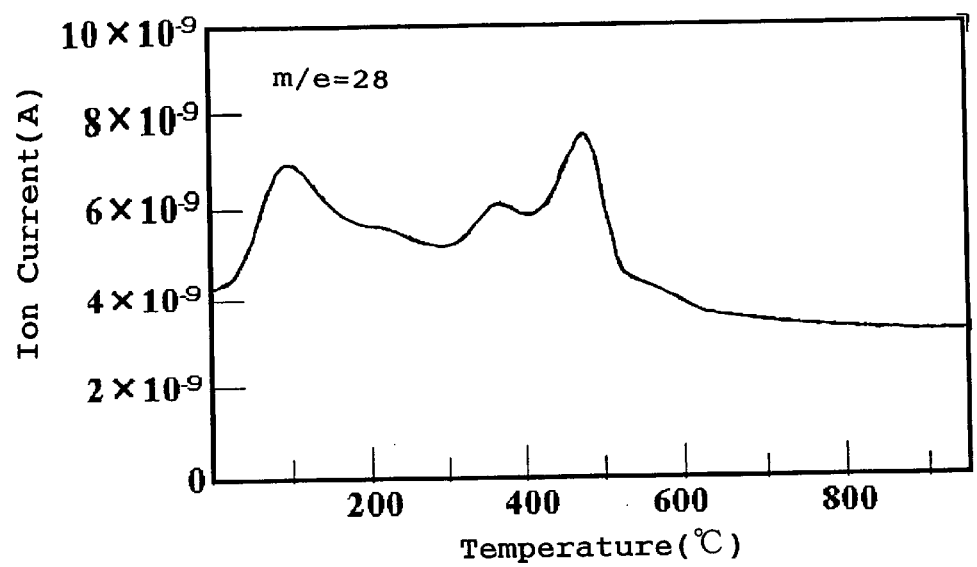
FIG. 5 is a selected ion chromatogram of the commercially available titanium oxide (which was utilized in Comparative Example 1), as to an evolution gas having 28 of the m/e ratio, the selected ion chromatogram being measured in a thermogravimetry-mass-spectroscopy under a condition of applying a CEM voltage of 1500V.
Figure 6:
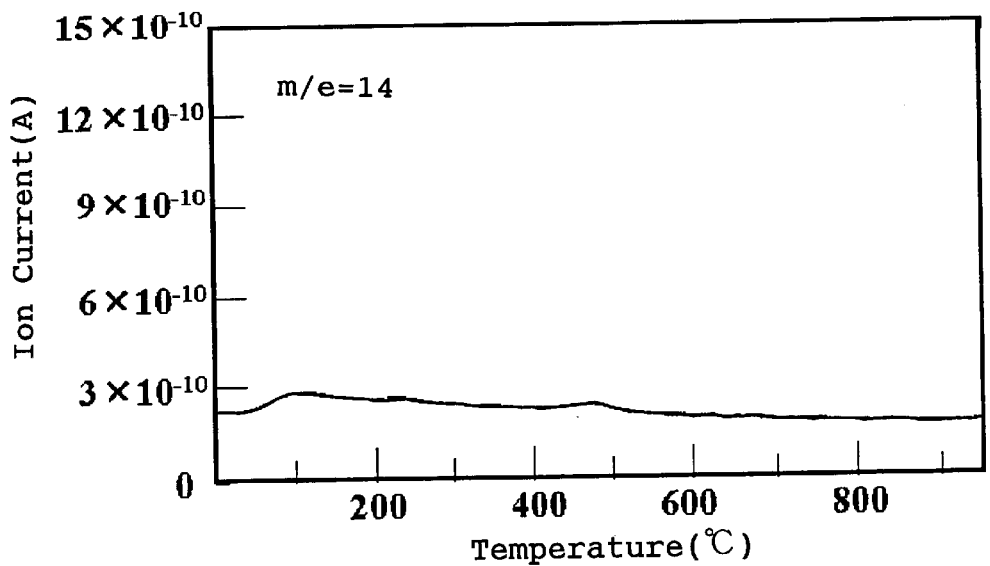
FIG. 6 is a selected ion chromatogram of the commercially available titanium oxide (which was utilized in Comparative Example 1), as to an evolution gas having 14 of the m/e ratio, the selected ion chromatogram being measured in a thermogravimetry-mass-spectroscopy under a condition of applying a CEM voltage of 1500V.

FIG. 5 shows that the selected ion chromatogram of the evolution gas having 28 of the m/e ratio exhibits no peak at 600° C. or higher in applying a CEM voltage of 1500V. FIG. 6 shows that the selected ion chromatogram of the evolution gas having 14 of the m/e ratio exhibits no peak at 600° C. or higher in applying a CEM voltage of 1500V. FIG. 7 shows that the selected ion chromatogram of the evolution gas having 64 of the m/e ratio exhibits peaks at 540° C. and at 777° C. in applying a CEM voltage of 1500V. FIG. 8 shows that the selected ion chromatogram of the evolution gas having 28 of the m/e ratio exhibits no peak at 600° C. or higher in applying a CEM voltage of 1000V. FIG. 8 also shows that the selected ion chromatogram of the evolution gas having 14 of the m/e ratio exhibits no peak at 600° C. or higher in applying a CEM voltage of 1000V.

The commercially available titanium oxide had an a* value of −0.74 and a b* value of 2.67.

What is claimed is:

1. A titanium oxide having a selected ion chromatogram in which an evolution gas having 28 of a ratio of mass number to electric charge quantity exhibits at least one peak at about 600° C. or higher, and further having a selected ion chromatogram in which an evolution gas having 64 of a ratio of mass number to electric charge quantity exhibits at least one peak at 800° C. or higher, the selected ion chromatogram being measured in a thermogravimetry-mass-spectroscopy.

2. The titanium oxide according to claim 1, further having a selected ion chromatogram in which an evolution gas having 14 of a ratio of mass number to electric charge quantity exhibits a peak at about 600° C. or higher, the selected ion chromatogram being measured in a thermogravimetry-mass-spectroscopy.

3. The titanium oxide according to claim 2, wherein said peak of the evolution gas having 14 of a ratio of mass number to electric charge quantity is exhibited at about 950° C. or lower.

4. The titanium oxide according to claim 1, wherein said peak of the evolution gas having 28 of a ratio of mass number to electric charge quantity is exhibited at about 950° C. or lower.

5. The titanium oxide according to any one of claims 1 to 3, wherein the selected ion chromatogram is measured under a condition of applying a Channeltron Electron Multiplier voltage of 1000V.

6. The titanium oxide according to any one of claims 1 to 3, wherein the selected ion chromatogram is measured under a condition of applying a Channeltron Electron Multiplier voltage of 1500V.

7. A photocatalyst containing the titanium oxide as claimed in any one of claims 1 to 3 as a catalyst component.

8. A photocatalyst coating composition comprising the titanium oxide as claimed in any one of claims 1 to 3 and a solvent.

9. The titanium oxide according to claim 1, further having a* value of from −6 to −2 in terms of L*a*b* color space.

10. The titanium oxide according to claim 1, further having b* value of 8 or more in terms of L*a*b* color space.

11. The titanium oxide according to claim 1, further having b* value of 15 or more in terms of L*a*b* color space.

12. A photocatalyst containing the titanium oxide as claimed in any of claims 9 to 11 as a catalyst component.

13. A photocatalyst coating composition comprising the titanium oxide as claimed in any of claims 9 to 11 and a solvent.

* * * * *